United States Patent
Larson et al.

(10) Patent No.: US 7,865,277 B1
(45) Date of Patent: Jan. 4, 2011

(54) OBSTACLE AVOIDANCE SYSTEM AND METHOD

(75) Inventors: Jacoby R. Larson, San Diego, CA (US); Michael H. Bruch, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 274 days.

(21) Appl. No.: 11/956,209

(22) Filed: Dec. 13, 2007

Related U.S. Application Data

(60) Provisional application No. 60/916,452, filed on May 7, 2007.

(51) Int. Cl.
G01C 22/00 (2006.01)
(52) U.S. Cl. ............. 701/23; 114/50; 114/221 A; 89/5; 89/1.809
(58) Field of Classification Search .......... 701/23, 701/2, 24; 342/43–51, 65–66, 69, 76, 77, 342/94–97, 104–118, 126, 139, 146, 147–158, 342/357.06, 357.08, 454, 455; 340/436, 340/444, 465, 466
See application file for complete search history.

(56) References Cited

U.S. PATENT DOCUMENTS

| | | | | |
|---|---|---|---|---|
| 5,764,061 | A * | 6/1998 | Asakawa et al. | 324/326 |
| 6,055,042 | A * | 4/2000 | Sarangapani | 356/4.01 |
| 7,296,530 | B1 * | 11/2007 | Bernstein et al. | 114/322 |
| 7,299,130 | B2 * | 11/2007 | Mulligan et al. | 701/213 |
| 2005/0043925 | A1 * | 2/2005 | Hepner et al. | 702/185 |
| 2005/0102098 | A1 * | 5/2005 | Montealegre et al. | 701/209 |
| 2005/0225477 | A1 * | 10/2005 | Cong et al. | 342/70 |
| 2005/0285773 | A1 * | 12/2005 | Hartzstein et al. | 342/70 |
| 2006/0271251 | A1 * | 11/2006 | Hopkins | 701/23 |

(Continued)

FOREIGN PATENT DOCUMENTS

WO WO96/03662 * 2/1998

OTHER PUBLICATIONS

Osafune, Lin and Leonardi, "Multi-HOP Vehicular Brroadcast(MHVB)", 2006 6th International Conference on ITS Telecommunications Proceedings, , pp. 757-760, 2006, IEEE.*

(Continued)

*Primary Examiner*—Jack Keith
*Assistant Examiner*—Muhammad Shafi
(74) *Attorney, Agent, or Firm*—Ryan J. Friedl; Kyle Eppele

(57) ABSTRACT

A method includes the steps of receiving a present route for a vehicle based on a present vehicle location and a vehicle destination, receiving obstacle information from a sensor of a sensor array, the received obstacle information including information about at least one moving obstacle, and determining if the received present route is valid based upon the received obstacle information. If the received present route is invalid, the method determines a revised route based upon the received present route, the received obstacle information, and/or the vehicle destination. A system incorporating the method may include a sensor array, a communication link, a processing module, and a navigation module. The system and method may be used to control the route of a vehicle such as an unmanned surface vehicle that may be land-based, water-based, or air-based.

3 Claims, 7 Drawing Sheets

U.S. PATENT DOCUMENTS

2009/0216444 A1* 8/2009 Crowell ............... 701/213

OTHER PUBLICATIONS

Osafune et al. ( 0/7803-9586-7/60, 2006, IEEE).*

Williams, G.N., Lagace, G.E., Woodfin, A.; ACollision Avoidance controller for autonomous underwater vehicles, Autonomous Underwater Vehicle technology, 1990, AUV '90., Proceedings of the (1990) Symposium on, Jun. 5-6, 1990, p. 206-212, 10.1109/AUV.1990.110458).*

Larry Matthies, Alonzo Kelly, Todd Litwin, Greg Tharp; "Obstacle Detection for Unmanned Vehciles : A Progress Report"; Jet Propulsion Laboratory—California Institute of technology, Proceedings of the Intelligence Vehicles '95 Symposium, Sep. 25, 1995-Sep. 26, 1995, pp. 66-71, 10.1109/IVS.1995.528259.*

* cited by examiner

OBSTACLE AVOIDANCE SYSTEM AND METHOD

CROSS-REFERENCE TO RELATED APPLICATIONS

This application claims the benefit of U.S. Provisional Patent Application Ser. No. 60/916,452, filed May 7, 2007, entitled "Obstacle Avoidance System and Projected Obstacle Area," the content of which is fully incorporated by reference herein.

FEDERALLY SPONSORED RESEARCH AND DEVELOPMENT

The Obstacle Avoidance System and Method is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice (619) 553-2778; email T2@spawar.navy.mil. Reference Navy Case Number 97506.

BACKGROUND

The Obstacle Avoidance System and Method relates generally to the field of obstacle avoidance systems and methods. Typical obstacle avoidance systems do not re-determine a route by incorporating present route information. Further, typical obstacle avoidance systems do not determine routes using information about moving obstacles. There is a current need for an obstacle avoidance system and method that provides such features.

DETAILED DESCRIPTION OF SOME EMBODIMENTS

Figure 1:
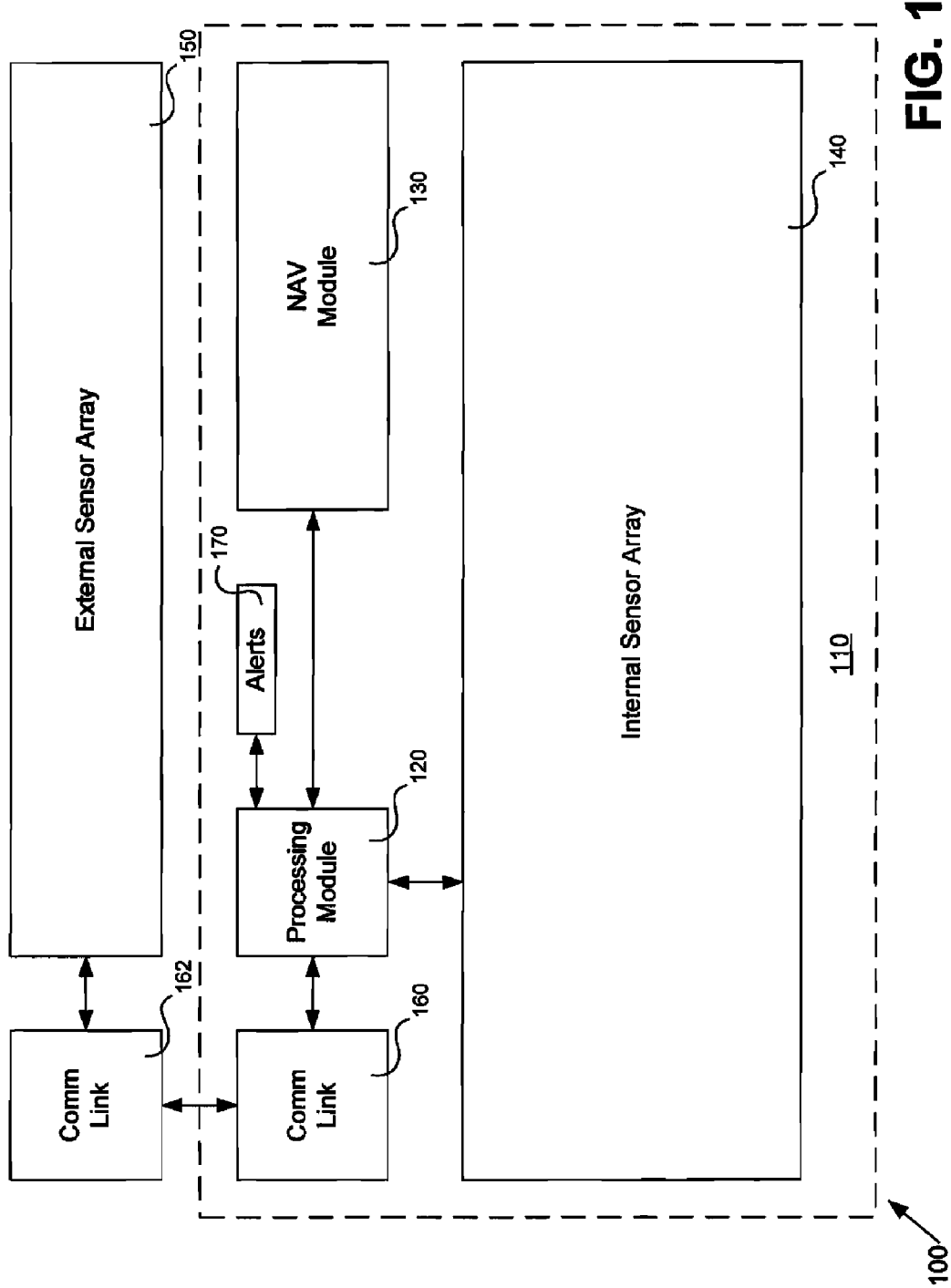
FIG. 1 shows a block diagram of one embodiment of an Obstacle Avoidance System and Method.

Referring to FIG. 1, there is shown a block diagram of one embodiment of an obstacle avoidance system (OAS) 100. OAS 100 may include hardware modules for implementing a method for obstacle avoidance while traveling from an origination location to a destination location using a far-field module designed to determine a revised route based on an original present route. In one embodiment, the OAS includes a method of avoiding obstacles while traveling from an origination location to a destination location using a near-field module and a far-field module, wherein the far-field module is designed to determine a revised route based on an original present route. As shown in FIG. 1, OAS 100 includes Onboard Obstacle Avoidance Module (OOAM) 110, communication link 162 and external sensor array 150. OOAM 110 is designed to reside on and/or in a vehicle such as an Unmanned Surface Vehicle (USV). A USV may be a vehicle designed to travel on the surface of a body of liquid. Examples of USVs are a boat and a hydrofoil. In other embodiments, OOAM 110 may be used in other vehicles without departing from the spirit and scope of the OAS. In some embodiments, the vehicle may be a land-based vehicle, such as a car or jeep. In some embodiments, the vehicle may be a water-based vehicle, such as a boat or ship. In some embodiments, the vehicle may be an air-based vehicle, such as a helicopter or plane. OOAM 110 may include a processing module 120, navigation (NAV) module 130, internal sensor array 140, communication link 160 and alerts module 170.

Processing module 120 comprises a general-purpose computing device such as a conventional personal computer, which is described in more detail with reference to FIG. 4 below. Processing module 120 may be operatively connected to NAV module 130, internal sensor array 140, communication link 160, and alerts module 170. Processing module 120 may receive information from internal sensor array 140 and an external sensor array 150, process information and transmit control commands to NAV module 130, and transmit alert commands to alerts module 170.

In some embodiments, NAV module 130 is designed to navigate a vehicle, such as a USV, by receiving and executing routes for the vehicle. NAV module 130 may be operatively connected to processing module 120. NAV module 130 receives present route information and revised route information from processing module 120. Then, as an example, NAV module 130 may use the present route information to change the direction, velocity, and/or turn rate of the vehicle by transmitting signals to a driver module which may activate the actuators of the vehicle. NAV module 130 may comprise an embedded or standard PC computer.

OAS 100 may include a sensor array including at least one sensor for sensing obstacle information about at least one moving obstacle. In one embodiment, the sensor array may be an internal sensor array, such as internal sensor array 140. In one embodiment, the sensor array may be an external sensor array, such as external sensor array 150. In one embodiment, the sensor array may include an internal sensor array 140 and an external sensor array 150. Internal sensor array 140 includes at least one sensor that resides in and/or on a USV. Exemplary sensors of internal sensor array 140 may include the following: magnetometer, LADAR, pan/tilt video camera, antenna automatic identification system (AIS), GPS, millimeter wave RADAR, RADAR, monocular vision camera, stereo vision camera, SONAR, gyroscope, compass and accelerometer. Internal sensor array 140 is designed to obtain information regarding obstacles and/or conditions in the area of OOAM 110. Internal sensor array 140 may be operatively connected to processing module 120. Internal sensor array 140 may transmit information regarding moving or stationary obstacles to processing module 120.

Processing module 120 may transmit information to internal sensor array 140 depending on the type of internal sensor of internal sensor array 140. For example, processing module 120 may transmit a tilt command to a pan/tilt video camera of internal sensor array 140. Processing module may be operatively connected to communication link 160. Processing module 120 may transmit information to external sensor array 150 via communication link 160. Processing module 120 may be configured to perform methods 300, 500, and 600 as described herein. For example, processing module 120 may be configured to receive a present route for a vehicle based on a present vehicle location and a vehicle destination, receive the sensed obstacle information from a sensor array, determine if the received present route is valid based upon the received sensed obstacle information, if the received present route is valid, then continue to the step of receiving a present route, and if the received present route is invalid, then determine a revised route based upon the received present route, the received sensed obstacle information, and/or the vehicle destination.

External sensor array 150 is designed to obtain information regarding obstacles in the area of OOAM 110. Exemplary sensors of external sensor array 150 include the following: shore-based RADAR, ship-based RADAR, aircraft-based RADAR, ship-based SONAR, weather satellite and aerial photographic platforms. External sensor array 150 may transmit information regarding obstacles and/or conditions to processing module 120 via communication links 162, 160. Processing module 120 may transmit information to external sensor array 150 depending on the type of sensor of external sensor array 150.

External sensor array 150 may be operatively connected to OOAM 110 via communication link 162. Examples of communication link 162 include a satellite transceiver, radio transceiver and cellular transceiver. Separate components of external sensor array 150 may be operatively connected to OOAM 110 via separate communication links of communication link 160. For example a shore-based RADAR sensor of external sensor array 150 may be linked to OOAM 110 via a satellite transceiver of communication link 162 and an unmanned aerial vehicle RADAR of external sensor array 150 may be linked to OOAM 110 via a radio transceiver of communication link 162. Both internal sensor array 140 and external sensor array 150 are not limited in the amount and type of sensors that may be comprised therein. Further, internal sensor array 140 and external sensor array 150 may be configured to readily allow for the addition of one or more sensors.

Communication link 160 receives and transmits communication signals. Communication link 160 may be operatively connected to processing module 120. Communication link 160 may also be operatively connected to the sensor array, such as internal sensor array 140 and/or external sensor array 150. Examples of communication link 160 include a satellite transceiver, radio transceiver and cellular transceiver. Communication link 160 may comprise a combination of components such as a combination of a satellite transceiver, radio transceiver and cellular transceiver. Communication link 162 may be operatively connected to communication link 160.

Alerts module 170 may be operatively connected to processing module 120. Alerts module 170 may include at least one alert such as a visual alert, audible siren and/or alphanumeric message. In some embodiments, alerts module 170 is designed to receive an alert message from processing module 120 and activate the alert associated with the alert message. As an example, processing module 120 may transmit an alert message to alerts module 170 if the vehicle detects a hazardous condition, such as an imminent collision or unsafe route. Alerts module 170 may also display an alert to a user if an internal system failure has occurred, such as a mechanical, sensor, or module failure. Alerts module 170 may also display an alert to a user if the revised route intersects a moving or stationary obstacle or the vehicle travels into restricted territories.

Figure 2:
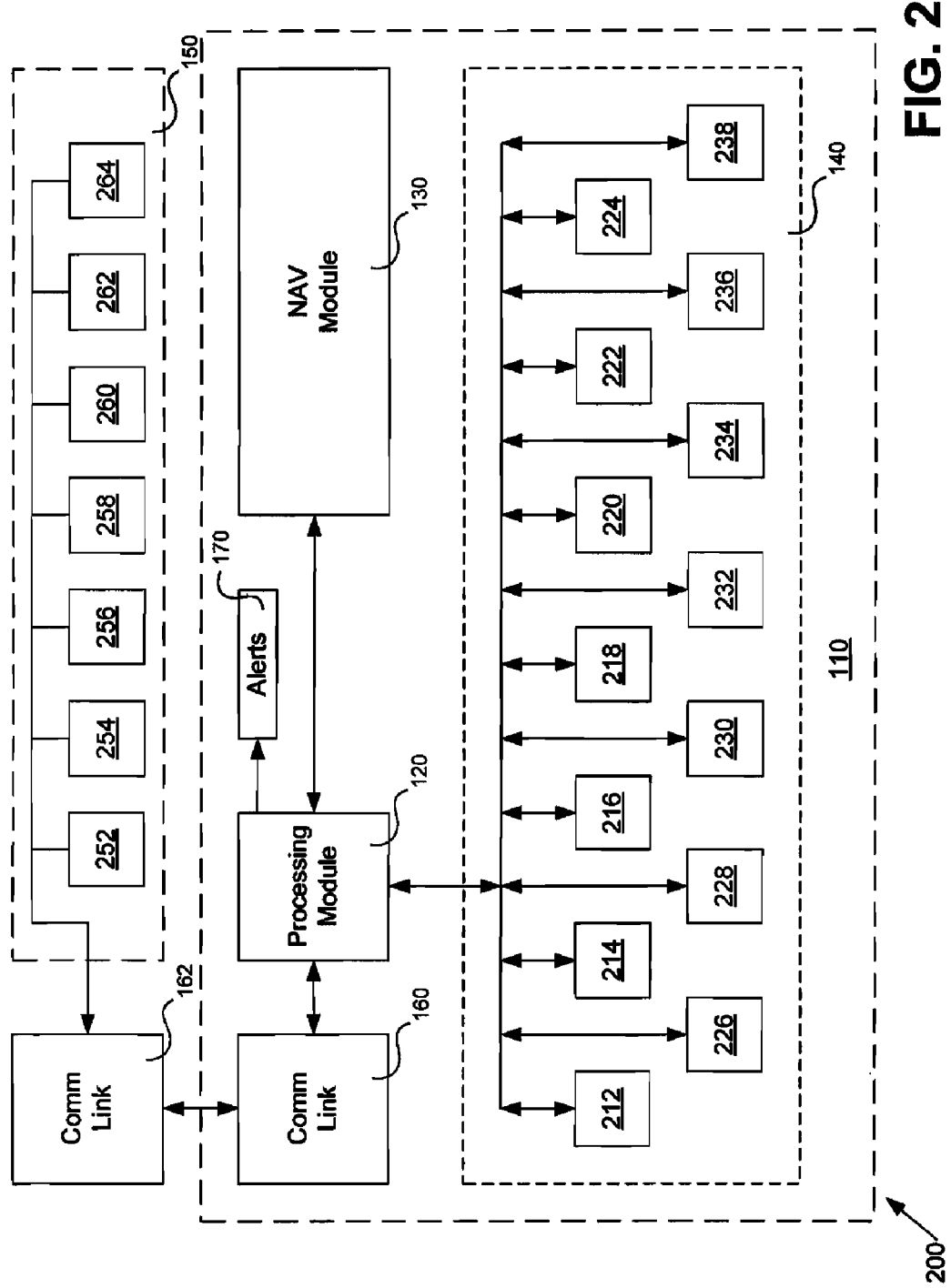
FIG. 2 shows a block diagram of one embodiment of an Obstacle Avoidance System and Method.

FIG. 2 shows a block diagram of one embodiment of an OAS 200. FIG. 2 is substantially similar to FIG. 1, and thus, similar components are not described again. OAS 200 includes OOAM 110, communication link 162 and external sensor array 150. OOAM 110 may include processing module 120, navigation (NAV) module 130, internal sensor array 140, communication link 160 and alerts module 170.

As shown in FIG. 2, internal sensor array 140 may include sensors 212, 214, 216, 218, 220, 222, 224, 226, 228, 230, 232, 234, 236 and 238. Sensor 212 comprises a magnetometer. Sensor 214 comprises a LADAR. Sensor 216 comprises a pan/tilt video camera. Sensor 218 comprises an antenna AIS. Sensor 220 comprises a GPS. Sensor 222 comprises a millimeter wave RADAR. Sensor 224 comprises a RADAR. Sensor 226 comprises a monocular vision camera. Sensor 228 comprises a stereo vision camera. Sensor 230 comprises a SONAR. Sensor 232 comprises a gyroscope. Sensor 234 comprises a compass. Sensor 236 comprises a accelerometer. Sensor 238 comprises a miscellaneous sensor.

As shown in FIG. 2, external sensor array 150 may include sensors 252, 254, 256, 258, 260, 262 and 264. Sensor 252 comprises shore-based RADAR. Sensor 254 comprises ship-based RADAR. Sensor 256 comprises aircraft-based RADAR. Sensor 258 comprises an aerial photographic platform. Sensor 260 comprises a weather satellite. Sensor 262 comprises ship-based SONAR. Sensor 264 comprises a miscellaneous sensor.

Figure 3:
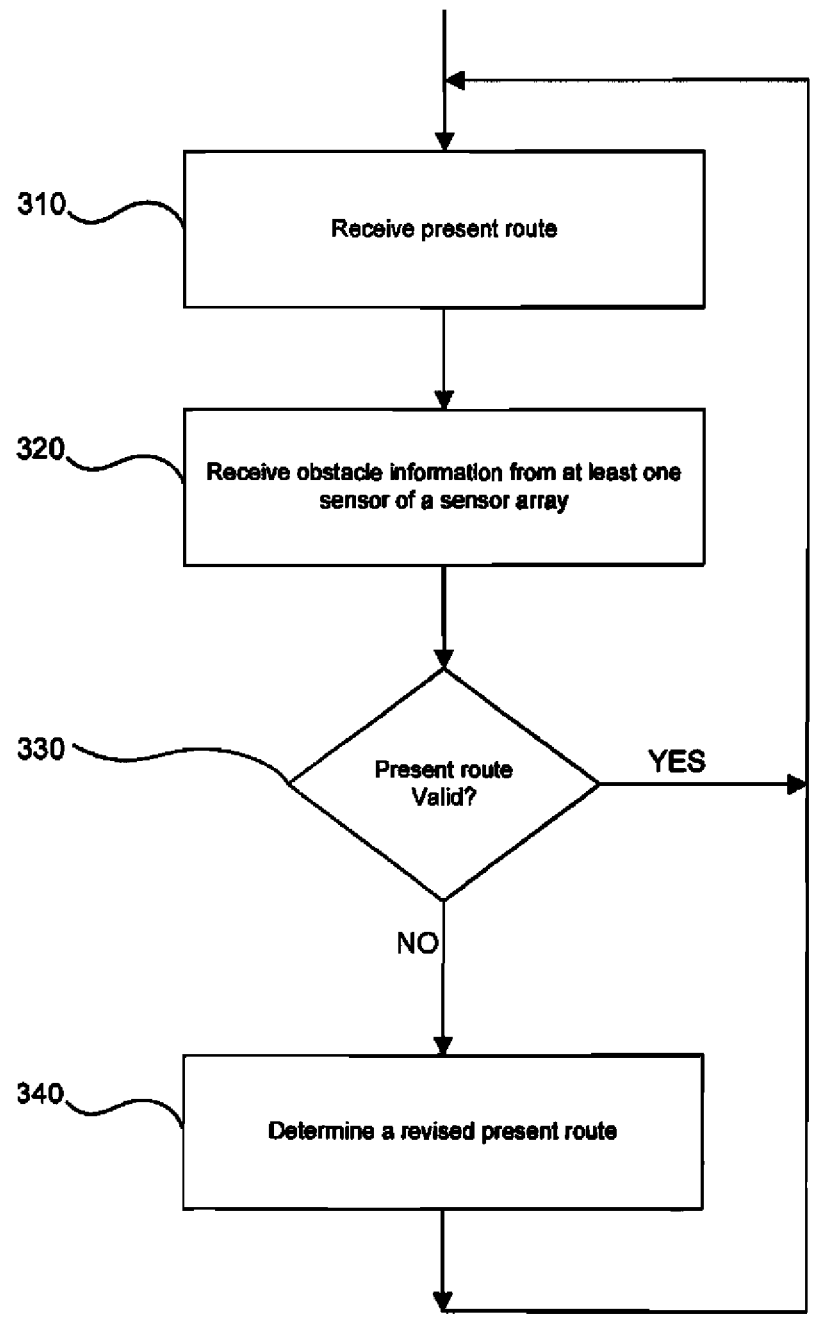
FIG. 3 shows a flowchart of one embodiment of a method of an Obstacle Avoidance System and Method.

FIG. 3 shows one embodiment of a method 300 of an OAS. For illustrative purposes, method 300 will be discussed with reference to OAS 100. However, method 300 may be implemented by other embodiments of obstacle avoidance systems, including OAS 200 and OAS 700 described herein. Referring to FIG. 3, at BOX 310, method 300 receives a present route for a vehicle. In one embodiment, the present route is received by processing module 120 from a source external from processing module 120. The received present route may be based on a present vehicle location and a vehicle destination. A vehicle destination is the end location that the vehicle is attempting to reach. In one embodiment, the vehicle destination is supplied by a user of the obstacle avoidance system. In one embodiment, the vehicle destination is predetermined and stored in memory operatively connected to processing module 120. In one embodiment, BOX 310 is performed using software stored in processing module 120. After BOX 310, method 300 may proceed to BOX 320.

At BOX 320, method 300 receives obstacle information from at least one sensor of a sensor array. In one embodiment, processing module 120 may receive obstacle information from internal sensor array 140 and/or external sensor array 150. In one embodiment, BOX 320 is performed using software stored in processing module 120. In one embodiment, the received obstacle information may include information about at least one moving obstacle. In one embodiment, the received obstacle information may include information about at least one moving obstacle and at least one stationary obstacle. For example, for a vehicle in a water-based environment, moving obstacles may include personal watercraft, boats, and ships, while stationary obstacles may include coastlines, piers, and buoys. In some embodiments, the moving obstacle may be located outside of a predetermined distance from the present vehicle location. As an example, a predetermined distance may be determined based upon the speed of the vehicle and the amount of time required to determine a revised route. After BOX 320, method 300 may proceed to BOX 330.

At BOX 330 method 300 determines whether the present route is valid. As an example, the determination may be made by processing module 120. In one embodiment, BOX 330 is performed using software stored in processing module 120.

In one embodiment, the determination whether the present route is valid may be made based upon the received obstacle information from the at least one sensor of the sensor array. In one embodiment, the determination whether the present route is valid may be made based upon the rules of the vehicle's operating environment. As an example, if the vehicle is in a water-based environment, the rules of the operating environment for water-based vehicles may dictate that if two vessels are approaching head on, the vessels must pass port-to-port. Other rules may involve proper vehicle direction flow and vehicle right-of-way rules. In one embodiment, the determination whether the present route is valid may be made based upon the received obstacle information from the at least one sensor of the sensor array and the rules of the vehicle's operating environment. In one embodiment, the determination whether the present route is valid may be made based upon the vehicle destination. In one embodiment, the determination whether the present route is valid may be made based upon a combination of the rules of the vehicle's operating environment, the received obstacle information from the at least one sensor of the sensor array, and/or the vehicle destination. If the present route is valid, method 300 returns to BOX 310, else, method 300 proceeds to BOX 340.

At BOX 340 method 300 determines a revised route. As an example, the determination may be made by processing module 120. In one embodiment, BOX 340 is performed using software stored in processing module 120. The revised route may be determined based upon the received present route and the received obstacle information, the vehicle destination, and/or the rules of the vehicle's operating environment. The revised route may be determined in accordance with the method described with regard to far-field module 730, discussed in more detail with reference to FIG. 7. After BOX 340, method 300 may return to BOX 310.

Figure 4:
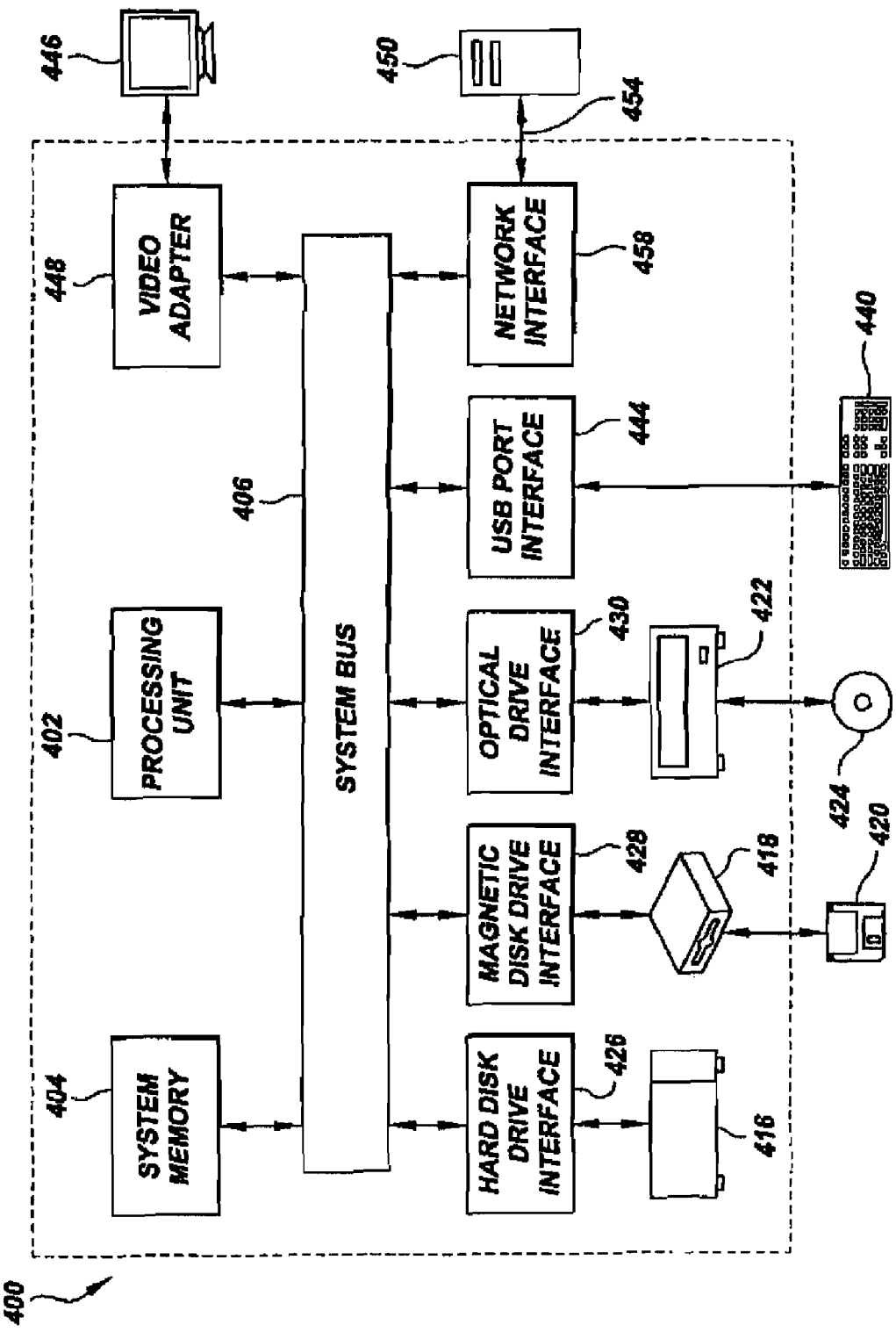
FIG. 4 shows a block diagram illustrating an embodiment of an apparatus for implementing an embodiment of the Obstacle Avoidance System and Method.

FIG. 4 shows a block diagram illustrating one embodiment of a processing module for use within an embodiment of the OAS, such as OAS 100. FIG. 4, and the following description, are intended to provide a brief, general description of a suitable computing environment in which an embodiment of the OAS may be implemented. Although not required, the OAS will be described in the general context of computer-executable instructions, such as program modules, being executed by a personal computer. Generally, program modules include routines, programs, objects, components, information structures, etc. . . . , that each perform particular tasks or implement particular abstract information types. Moreover, those skilled in the art will appreciate that embodiments of the OAS may be practiced with other computer system configurations, including hand-held devices, multiprocessor systems, microprocessor-based or programmable consumer electronics, network personal computers, minicomputers, mainframe computers, and the like. Embodiments of the OAS may also be practiced in distributed computing environments where tasks are performed by remote processing devices that are linked through a communications network. In a distributed computing environment, program modules may be located on both local and remote memory storage devices.

As shown in FIG. 4, an embodiment of a processing module for use within an OAS system may include a general-purpose computing device in the form of a conventional personal computer 400, which may include processing unit 402, system memory 404 and system bus 406 that operatively couple various system components to other system components (e.g., system bus 406 operatively couples system memory 404 to processing unit 402). Examples of system bus 406 include a memory bus, memory bus controller, peripheral bus and local bus using any of a variety of known bus structures. System memory 404 may include read only memory, random access memory and basic input/output system.

Personal computer 400 further may include hard disk drive 416 for reading from and writing to a hard disk (not shown in FIG. 4) a magnetic disk drive 418 for reading from or writing to a removable magnetic disk 420 (e.g., 3.5-inch disk), and an optical disk drive 422 for reading from and writing to a removable optical disk 424 (e.g., CD-ROM and DVD). Hard disk drive 416, magnetic disk drive 418 and optical disk drive 422 are operatively connected to system bus 406 via hard disk drive interface 426, magnetic disk drive interface 428 and optical drive interface 430, respectively. The drives and their associated computer-readable media provide nonvolatile storage of computer readable instructions, information structures, program modules and other information for personal computer 400. The method steps of embodiments of the present OAS may be stored on a hard disk, magnetic disk 420 and optical disk 424. Although the exemplary environment described herein employs a hard disk, magnetic disk 420 and optical disk 424, it should be appreciated by those skilled in the art that other types of computer readable media that may store information accessible by a computer, (e.g., magnetic cassettes, flash memory cards, digital video disks, Bernoulli cartridges, random access memories and read only memories) may also be used in the exemplary operating environment without departing from the scope or spirit of embodiments of the OAS.

A user may enter commands and information into personal computer 400 via input devices such as keyboard 440 and pointing devices (e.g., mouse and trackball) (not shown in FIG. 4). Examples of input devices (not shown in FIG. 4) include a microphone, joystick, game pad, and satellite dish. Input devices may be operatively connected to processing unit 402 via universal serial bus (USB) port interface 444 that is operatively connected to system bus 406. Input devices may also be operatively connected to processing unit 402 via other interfaces (e.g., parallel port, serial port and game port) that are operatively connected to system bus 406. Monitor 446 is operatively connected to system bus 406 via video adapter 448. Other peripheral devices (e.g., speakers and printers) may be operatively connected to personal computer 400 via other interfaces.

Personal computer 400 may operate in a networked environment using logical connections to one or more remote computers such as remote computer 450 via network 454. Examples of network 454 include local area networks, wide area networks and wireless networks. Examples of remote computer 450 include a personal computer, server, router, network personal computer, peer device and network node.

Figure 5:
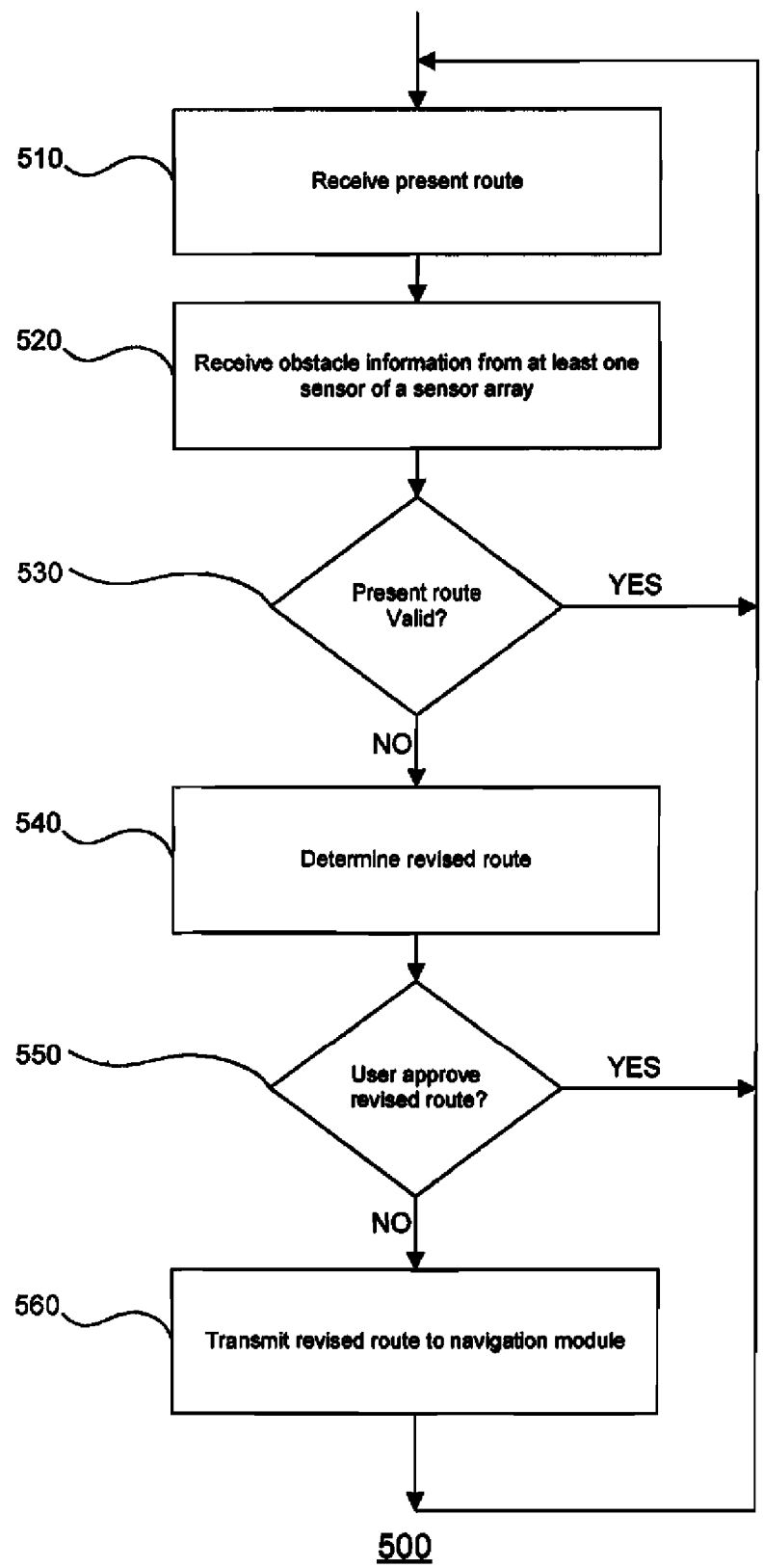
FIG. 5 shows a flowchart of one embodiment of a method of an Obstacle Avoidance System and Method.

FIG. 5 shows a one embodiment of a method 500 of an OAS. Method 500 is one embodiment of a method of an OAS referred to as a far-field obstacle avoidance embodiment. For illustrative purposes, method 500 will be discussed with reference to OAS 100. However, method 500 may be implemented by other embodiments of obstacle avoidance systems, including OAS 200 and OAS 700 described herein. Referring to FIG. 5, at BOX 510, method 500 receives a present route. In one embodiment, processing module 120 receives a present route from a source external to processing module 120. In one embodiment, BOX 510 is performed using software stored in processing module 120. After BOX 510, method 500 may proceed to BOX 520. At BOX 520 method 500 may receive obstacle information from at least one sensor of a sensor array. In one embodiment, processing module 120 may receive obstacle information from internal sensor array 140 and/or external sensor array 150. In one embodiment, BOX 320 is performed using software stored in processing module 120. In one embodiment, the received obstacle information may include information about at least one moving obstacle. In one embodiment, the received obstacle information may include information about at least one moving obstacle and at least one stationary obstacle. For example, for a vehicle in a water-based environment, moving obstacles may include personal watercraft, boats, and ships, while stationary obstacles may include coastlines, piers, and buoys. In some embodiments, the moving obstacle may be located outside of a predetermined distance from the present vehicle location. As an example, a predetermined distance may be determined based upon the speed of the vehicle and the amount of time required to determine a revised route. After BOX 520, method 500 may proceed to BOX 530.

At BOX 530 method 500 determines whether the present route is valid. As an example, the determination may be made by processing module 120. In one embodiment, BOX 530 is performed using software stored in processing module 120. In one embodiment, the determination whether the present route is valid may be made based upon the received obstacle information from the at least one sensor of the sensor array. In one embodiment, the determination whether the present route is valid may be made based upon the rules of the vehicle's operating environment, as discussed above with reference to method 300. In one embodiment, the determination whether the present route is valid may be made based upon the received obstacle information from the at least one sensor of the sensor array and the rules of the vehicle's operating environment. In one embodiment, the determination whether the present route is valid may be made based upon the vehicle destination. In one embodiment, the determination whether the present route is valid may be made based upon a combination of the rules of the vehicle's operating environment, the received obstacle information from the at least one sensor of the sensor array, and/or the vehicle destination. If the present route is valid, method 500 returns to BOX 510, else, method 500 proceeds to BOX 540.

At BOX 540 method 500 determines a revised route. As an example, the determination may be made by processing module 120. In one embodiment, BOX 540 is performed using software stored in processing module 120. The revised route may be determined based upon the received present route and the received obstacle information, the vehicle destination, and/or the rules of the vehicle's operating environment. The revised route may be determined in accordance with the method described with regard to far-field module 730, discussed in more detail below. After BOX 540, method 500 may proceed to BOX 550.

At BOX 550 method 500 determines whether a user approves of the revised route. The determination of a user whether or not to approve a route may be based on a comparison of the revised route with the current mission goals, which may be supplied by a user and/or stored in memory within the OAS. If the user approves of the revised route, method 500 returns to BOX 510, else, method 500 proceeds to BOX 560. In one embodiment, method 500 performs BOX 550 using software stored in processing module 120. At BOX 560 method 500 transmits the revised route to NAV module 130. In one embodiment, the revised route is transmitted to NAV module 130 by processing module 120. In one embodiment, method 500 performs BOX 560 using software stored in processing module 120. After BOX 560, method 500 may return to BOX 510. In some embodiments, after NAV module 130 receives the revised route, NAV module 130 may transmit commands to cause the direction and/or velocity of the vehicle to be changed to avoid one or more obstacles. After the one or more obstacles have been avoided, processing module 120 may then transmit commands to NAV module 130 to cause the vehicle to revert back to the original vehicle route.

Figure 6:
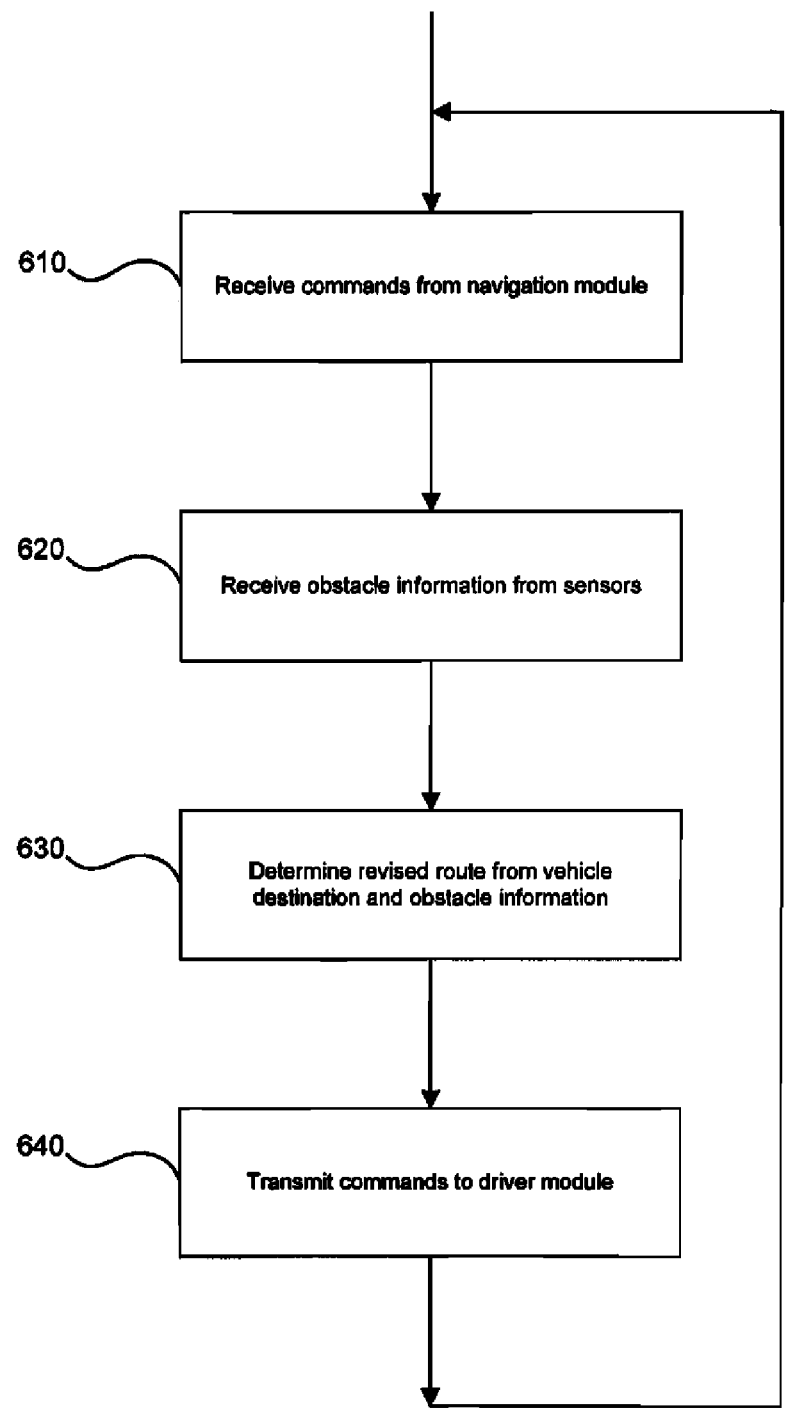
FIG. 6 shows a flowchart of one embodiment of a method of an Obstacle Avoidance System and Method.

FIG. 6 shows one embodiment of a method 600 of an OAS. Method 600 is one embodiment of a method of an OAS referred to as a near-field obstacle avoidance embodiment. For illustrative purposes, method 600 will be discussed with reference to OAS 100. However, method 600 may be implemented by other embodiments of obstacle avoidance systems, including OAS 200 and OAS 700 described herein. Referring to FIG. 6, at BOX 610 method 600 receives a command from NAV module 130. In one embodiment, the command is received by processing module 120. In one embodiment, BOX 610 is performed using software stored in processing module 120. After BOX 610, method 600 may proceed to BOX 620. At BOX 620 method 600 may receive obstacle information from sensors. In one embodiment, processing module 120 receives obstacle information in the form of maps from internal sensor array 140. In one embodiment, processing module 120 receives obstacle information in the form of maps from external sensor array 150. In one embodiment, processing module 120 receives obstacle maps from both internal sensor array 140 and external sensor array 150. After BOX 620, method 600 may proceed to BOX 630.

At BOX 630 method 600 determines a revised route from the vehicle destination and avoidance of obstacles information. In one embodiment, the revised route may be determined by processing module 120. The vehicle destination and the avoidance of obstacle information may be provided to processing module 120 from NAV Module 130, internal sensor array 140, and external sensor array 150. In one embodiment, BOX 630 is performed using software stored in processing module 120. After BOX 630, method 600 may proceed to BOX 640. At BOX 640 method 600 transmits commands to a driver module. As an example, in one embodiment processing module 120 transmits steering and throttle control commands to a driver module contained within NAV module 130. In another embodiment, a NAV module may transmit commands to a separate driver module (see FIG. 7). In one embodiment, BOX 640 is performed using software stored in processing module 120. After BOX 640, method 600 may return to BOX 610.

Figure 7:
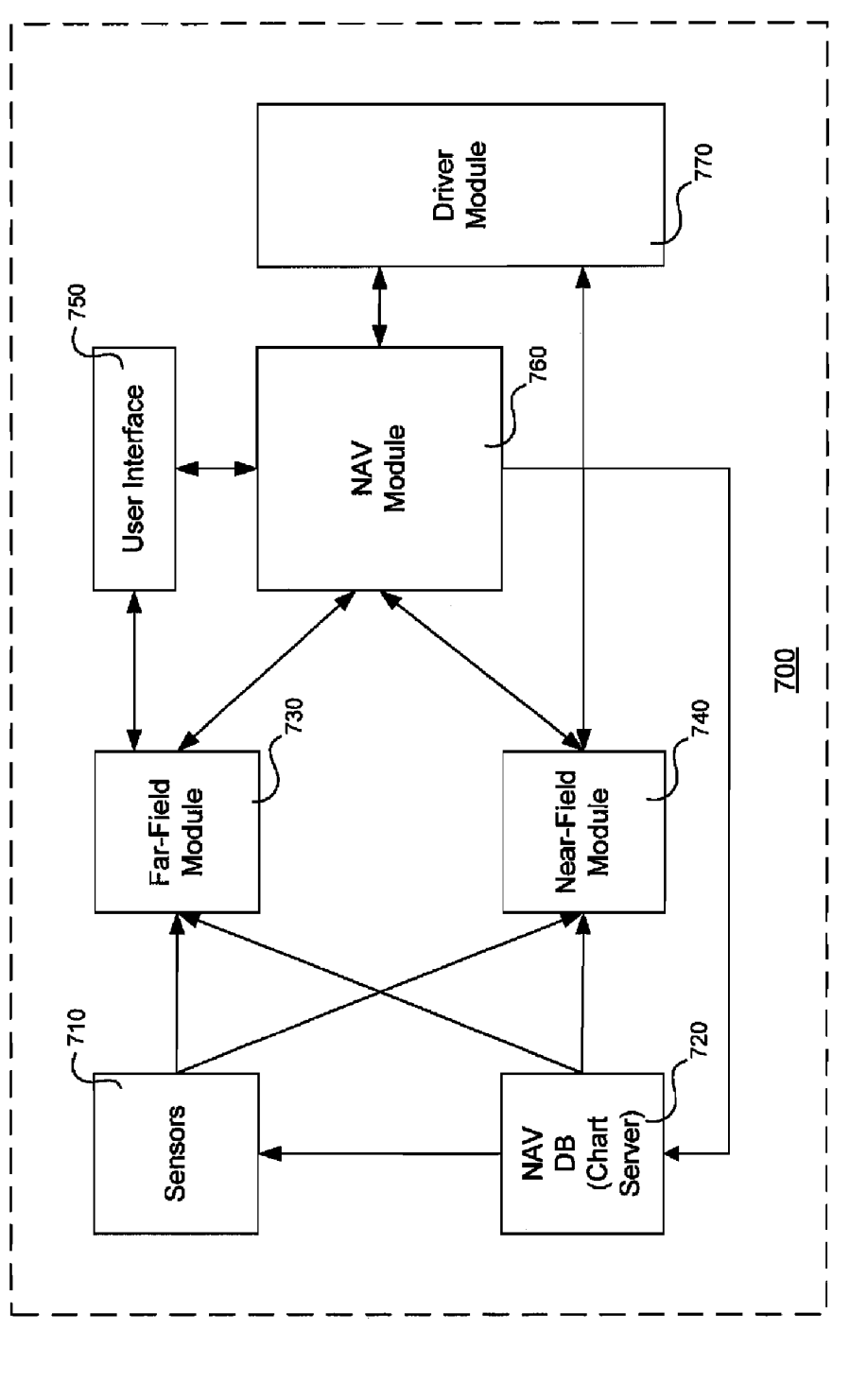
FIG. 7 shows a block diagram illustrating an embodiment of an apparatus for implementing an embodiment of an Obstacle Avoidance System and Method.

FIG. 7 shows a block diagram illustrating an embodiment of an apparatus for implementing an embodiment of an OAS. As shown in FIG. 7, OAS 700 includes sensors 710, NAV database 720, far-field module 730, near-field module 740, user interface 750, NAV module 760 and driver module 770.

Sensors 710 include one or more sensors for sensing obstacle information about at least one moving obstacle and at least one stationary obstacle. The at least one moving obstacle may be located outside of a predetermined distance from the present vehicle location. The predetermined distance may be determined based upon the speed of the vehicle and the amount of time required by far-field module 730 to determine a revised route. As an example, for a water-based vehicle, the predetermined distance may be between about 300 meters and about 400 meters. Sensors 710 may include internal sensors and external sensors. In one embodiment, sensors 710 include internal sensors. In one embodiment, sensors 710 include external sensors. In one embodiment, sensors 710 include both internal and external sensors.

NAV database 720 may be operatively connected to near-field module 740 and far-field module 730 for providing permanent obstacle information to near-field module 740 and far-field module 730. NAV database 720 may include various servers providing information, including a chart server, a RADAR server, and a SONAR server. As an example, the chart server may provide nautical chart information regarding all of the stationary known permanent obstacles in a given area, such as a particular geographical region of the world. As another example, the RADAR server and SONAR server may provide information on all RADAR contacts and SONAR contacts, respectively. As a further example, an advanced radar plotting aid (ARPA) may provide information about moving obstacles.

Far-field module 730 may be operatively connected to sensors 710 for planning a route for a vehicle to avoid obstacles that are located outside of a predetermined distance from the present vehicle location. Near-field module 740 may be operatively connected to sensors 710 for planning a route for a vehicle to avoid obstacles located within a predetermined distance from the present vehicle location. Near-field module 740 and far-field module 730 may operate simultaneously and in conjunction with one another to produce an obstacle-free route for the vehicle. Near-field module 740 and far-field module 730 may be operatively connected to NAV module 760 to transmit routes to NAV module 760.

Far-field module 730 may determine a revised route by iterating through sections of a waypoint route for the vehicle. Iterations may occur at pre-determined user-selected intervals. During every section of the route, far-field module 730 may calculate the closest point of approach (CPA) for each moving contact it has information for. If during a section, far-field module 730 finds a CPA of a moving obstacle that is closer than some distance, that obstacle is characterized as a threat. The calculation continues to find the last point in time that moving contact is still within some threat distance (still within the USV's route section). That last point along with the CPA is used as a basis for the projected obstacle area (POA). Then using the angle of error for the port and starboard side and the distance to either the CPA or last point, the outlying areas of the POA are created. A revised route may then be determined using the POA information.

Far-field module 730 may utilize a two-dimensional obstacle map in determining a revised route. The two-dimensional obstacle map may be an occupancy grid created by dividing the vehicle environment into a discrete grid and assigning each cell location a value representing the probability of being occupied or not occupied by an obstacle. The obstacle may contain information about stationary obstacles as well as moving obstacles. The planning of a route to avoid moving obstacles may include incorporating a third-dimension, time, into the two-dimensional obstacle map. To plan a route in a prompt manner, such as a few seconds, while accounting for moving obstacles, far-field module 730 may convert the third-dimension time into the two-dimensional obstacle map by determining the projected area traveled by the moving obstacle over a particular time period. Such a method may be similar to that disclosed by D. Rathbun, S. Kragelund, A. Pongpunwattana, and B. Capozzi in a document entitled "An Evolution Based Route Planning Algorithm for Autonomous Motion of a UAV through Uncertain Environments", from the Proceedings of 21$^{st}$ Digital Avionics Systems Conference, vol. 2, pp. 8D2-1-8D2-12, Irvine, Calif. 2002.

Far-field module 730 may utilize the A* search algorithm developed by Peter Hart, Nils Nilsson, and Bertram Raphael in 1968 to assist with the route planning process. The A* search algorithm is able to find an optimal route solution in a relatively short amount of time. Also, the A* algorithm uses a cost analysis at each step, allowing for the insertion of an added cost for proximity to obstacles. The obstacle proximity cost allows the USV to set a safety barrier around obstacles, which can also be adjusted for different obstacles. The A* cost analysis also can be extended for other costs such as direction, shipping lanes, soft obstacles, route time, etc.

Far-field module 730 may use the Velocity Obstacle (VO) method described by P. Fiorini and Z. Schiller in a document entitled "Motion Planning in Dynamic Environments Using the Relative Velocity Paradigm", from the Proceedings of IEEE International conference on Robotics and Automation, vol. 1, pp. 560-565, Atlanta, Ga., 1993, to determine velocities of moving obstacles that may cause a collision with the vehicle. Use of the VO method allows for the velocity range and trajectory range of the vehicle to be set such that the vehicle avoids moving obstacles. The VO method transforms a moving obstacle into a stationary one by considering the relative velocity and trajectory of the vehicle with respect to the obstacle. After producing a collision area called the velocity obstacle, defined using the relative velocity vector, the algorithm returns a set of vehicle velocity vectors guaranteeing collision avoidance. This transformation and collision area detection, when applicable, reduces the complexity of the route planning among moving obstacles problem to linear time. The VO method may be used by far-field module 730 as a first pass to avoid moving obstacles. However, in the case that changing velocity doesn't avoid collisions, far-field module 730 may change the route by creating POAs for each obstacle and then determining a safe alternative route using the A* search as discussed above.

Near-field module 740 may cause the USV to deviate from the present route. If such an instance occurs, far-field module 730 may determine a revised route that seeks to return to the previous present route as soon as possible. Such a feature may allow for the removal of obsolete routes caused by volatile moving obstacles or unreliable contact information received from NAV database 720. Near-field module 740 cause the USV to avoid obstacles that are within a predetermined distance from the USV by intercepting any tele-operation or driving commands sent from NAV module 760 or driver module 770 to the actuators or other components of the USV responsible for steering the USV. After interception, near-field module 740 may then modify the commands in real-time, then transmit them to the appropriate destination, to prevent the USV from colliding with obstacles. Near-field module 740 may be implemented based upon a behavior-based common-world model approach, wherein all of the near-field sensors are fused into a common local-world model and individual behaviors vote on specific navigation solutions within that model. As an example, the obstacle avoidance behavior of near-field module 740 may vote for actions that avoid or turn away from potential hazards while the route-following behavior of near-field module 740 votes for actions that will keep the USV on the present route.

Near-field module 740 may utilize an arc-space model to assist in avoiding obstacles located within a predetermined distance from the present vehicle location. The arc-space approach has been used in real-world systems, such as the Mars Rovers, and has its lineage back to the Morphin algorithm and Distributed Architecture for Mobile Navigation (DAMN) of Carnegie Mellon University. As applied in an embodiment of an OAS, a number of arcs are projected in front of the vehicle over a local world-model obstacle map. The number of arcs considered is a function of the map size and grid spacing, with the arcs spaced such that one arc passes through each of the outer cells. This approach guarantees that each cell in the grid is covered by at least one arc so that all navigable paths are considered. Each of the arcs may be related to the vehicle velocity and turn rate by $$R = \frac{V}{\theta} \qquad \text{(Eq. 1)}$$

where R is the radius of the arc, V is the vehicle velocity, and θ is the vehicle turn rate. For the obstacle avoidance behavior, each arc is given a weight or vote based on the distance the vehicle could travel along that arc before it encountered an obstacle. The longer arcs are weighted more favorably than the shorter arcs or arcs that are blocked near the vehicle. The votes may be are scaled from 0 to −1 so that they can be combined with votes from other navigation behaviors.

One common navigation behavior is waypoint navigation or route following. The waypoint navigation function produces a commanded turn rate and velocity based on the heading error between the vehicle's current heading and the heading toward the vehicle destination point along the route. At each cycle these turn-rate and velocity commands from the waypoint navigation function are converted into an arc. To form votes for the entire array of arcs, the primary arc is given the maximum value and votes for arcs on either side of it are linearly decreased until they reach a value of zero. The route following behavior does not vote against any arcs. Other arc-voting behaviors may be used to help navigate around obstacles. For example, these behaviors include a free-space behavior that votes (from 1 to 0) for large continuous sections of arcs that are unblocked, essentially open areas in the obstacle map. This behavior also votes for open arcs that fall between obstacles so that the vehicle will not always favor going around groups of obstacles. Weighting factors may be applied to the votes from each of the behaviors prior to combining them, so that some behaviors contribute more to the final outcome than other behaviors. In one embodiment, the obstacle avoidance behavior is weighted about three times heavier than any of the other behaviors.

User interface 750 may be operatively connected to NAV module 760 and far-field module 730 for allowing a user to accept and decline the routes for the vehicle. User interface 750 may be a software application similar to the multi-robot operator control unit (MOCU) developed by the U.S. Navy, which is an interface for viewing data in the form of maps, gauges, video, and vehicle location and then controlling and interfacing with the vehicle and sensor's location, actions, and properties. NAV module 760 may be operatively connected to near-field module 740 and far-field module 730 for receiving routes for the vehicle. Driver module 770 may be operatively connected to NAV module 760 for receiving driving commands from the NAV module 760 and controlling the driving of the vehicle.

In some embodiments, route changes made by far-field module 730 must be accepted or rejected by a user. For this to occur, user interface 750 must communicate with and receive updated routes from far-field module 730. The route acceptance process may begin with the user creating a route for the USV to follow. The route may then be sent to NAV module 760 and may be immediately executed. Far-field module 730 may then begin to plan an obstacle-free route. If any significant part of the route has changed, far-field module 730 may notify the user of an alternative route via user interface 750, giving up all control to the user, and setting its planning on hold until a response from the user is received. The revised route is displayed simultaneously with the present route on user interface 750 and the user can accept, accept and edit, or reject the revised route. If the user accepts the revised route, the changes are sent to NAV module 760 as the new present route. If the user accepts the revised route, but makes a few changes, that route is sent back to far-field module 730 to be planned again, after which, the new route is returned to user interface 750 for acceptance by the user. If the user rejects the revised route, far-field module 730 repeats the planning process.

Each of the methods described herein may be encoded on a computer readable storage medium, the methods represented by computer readable programming code. As an example, a computer readable storage medium may have a method encoded thereon, the method represented by computer readable programming code, the method comprising the steps of: receiving a present route for a vehicle, the received present route based on a present vehicle location and a vehicle destination; receiving obstacle information from at least one sensor of a sensor array, the received obstacle information including information about at least one moving obstacle; determining if the received present route is valid based upon the received obstacle information; if the received present route is valid, then returning to the step of receiving a present route; and if the received present route is invalid, then determining a revised route based upon the received present route, the received obstacle information, and the vehicle destination. The method may further comprise the step of transmitting the revised route to a navigation module.

Many modifications and variations of the Obstacle Avoidance System and Method are possible in light of the above description. Therefore, within the scope of the appended claims, the Obstacle Avoidance System and Method may be practiced otherwise than as specifically described. Further, the scope of the claims is not limited to the implementations and embodiments disclosed herein, but extends to other implementations and embodiments as may be contemplated by those with ordinary skill in the art.

We claim:

1. A system comprising:
one or more internal sensors internal to an unmanned water-based vehicle and one or more external sensors external to the unmanned water-based vehicle, the internal sensors and the external sensors each configured to sense obstacle information about at least one moving obstacle and at least one stationary obstacle, wherein the at least one moving obstacle is located outside of a predetermined distance from a present vehicle location;
a near-field module operatively connected to the one or more internal sensors and the one or more external sensors, the near-field module configured to plan a route for a the unmanned water-based vehicle to avoid obstacles located within the predetermined distance from the present vehicle location;
a far-field module operatively connected to the one or more internal sensors and the one or more external sensors, the far-field module configured to plan a route for the unmanned water-based vehicle to avoid obstacles located outside of the predetermined distance from the present vehicle location;
a navigation database operatively connected to the near-field module and the far-field module, the navigation database configured to provide stationary obstacle information to the near-field module and the far-field module;
a navigation module directly operatively connected to the near-field module and the far-field module, the navigation module configured to receive routes for the unmanned water-based vehicle from the near-field module and the far-field module;
a driver module operatively connected to the navigation module, the driver module configured to receive driving commands from the navigation module and control the driving of the unmanned water-based vehicle;

a user interface operatively connected to the navigation module and the far-field module, the user interface configured to allow a user to accept and decline the received routes for the unmanned water-based vehicle received by the navigation module wherein the near-field module and the far-field module operate simultaneously and in conjunction with one another to produce an obstacle-free route for the unmanned water-based vehicle based upon the sensed obstacle information, the stationary obstacle information, the rules of the unmanned water-based vehicle's operating environment, and a vehicle destination of the unmanned water-based vehicle.

2. The system of claim 1, wherein the predetermined distance is determined based upon the speed of the unmanned water-based vehicle and the amount of time required by the far-field module to determine a revised route.

3. The system of claim 1, wherein the predetermined distance is between about 300 meters and about 400 meters.

* * * * *